United States Patent
Odenheimer et al.

(10) Patent No.: US 10,708,270 B2
(45) Date of Patent: Jul. 7, 2020

(54) MEDIATED AUTHENTICATION AND AUTHORIZATION FOR SERVICE CONSUMPTION AND BILLING

(71) Applicant: SAP SE, Walldorf (DE)

(72) Inventors: Jens Odenheimer, Karlsruhe (DE); Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 205 days.

(21) Appl. No.: 16/006,445

(22) Filed: Jun. 12, 2018

(65) Prior Publication Data

US 2019/0379663 A1    Dec. 12, 2019

(51) Int. Cl.
*H04L 29/06* (2006.01)
*G06Q 30/04* (2012.01)

(52) U.S. Cl.
CPC ......... *H04L 63/0884* (2013.01); *G06Q 30/04* (2013.01); *H04L 63/029* (2013.01); *H04L 63/0853* (2013.01); *H04L 63/102* (2013.01)

(58) Field of Classification Search
CPC ............... H04L 63/0884; H04L 63/029; H04L 63/0853; H04L 63/102; H04L 63/10; H04L 63/0272; H04L 63/0815; H04L 67/02; G06Q 30/04
See application file for complete search history.

(56) References Cited

U.S. PATENT DOCUMENTS

| | | | |
|---|---|---|---|
| 7,234,133 B2 | 6/2007 | Klein | |
| 7,287,027 B2 | 10/2007 | Klein | |
| 7,324,994 B2 | 1/2008 | Klein | |
| 7,328,228 B2 | 2/2008 | Klein et al. | |
| 7,353,223 B2 | 4/2008 | Klein | |
| 7,533,135 B2 | 5/2009 | Klein et al. | |
| 7,558,794 B2 | 7/2009 | Klein et al. | |
| 7,596,555 B2 | 9/2009 | Klein | |
| 7,634,741 B2 | 12/2009 | Klein | |
| 7,685,124 B2 | 3/2010 | Klein | |
| 7,693,272 B2 | 4/2010 | Klein | |
| 7,707,176 B2 | 4/2010 | Schmidt | |

(Continued)

*Primary Examiner* — Chau Le

(74) *Attorney, Agent, or Firm* — Fish & Richardson P.C.

(57) ABSTRACT

A request is received for execution of a cloud service for a user of a customer of a cloud-computing platform, the request including a user identifier of the user but not a password for the user. The customer is determined from the user identifier included in the request for execution of the cloud service. A cloud connector endpoint for the customer is determined, where the cloud connector endpoint identifies a secure cloud connector tunnel for communication with a user mapper installed in a customer landscape of the customer. An authorization and authentication request is sent to the user mapper using the secure cloud connector tunnel, where the user mapper is configured to authenticate the user within the customer landscape and determine whether the user is authorized to use the requested cloud service. An authorization and authentication response is received from the user mapper that indicates whether the user is an authenticated user who is authorized to use the cloud service. In response to the authorization and authentication response indicating that the user is an authenticated user who is authorized to use the cloud service, a cloud token is granted that enables use of the cloud service.

20 Claims, 6 Drawing Sheets

(56) References Cited

U.S. PATENT DOCUMENTS

| | | |
|---|---|---|
| 7,756,846 B2 | 7/2010 | Klein et al. |
| 7,797,136 B2 | 9/2010 | Klein et al. |
| 7,827,160 B2 | 11/2010 | Kuhr et al. |
| 7,831,931 B2 | 11/2010 | Klein et al. |
| 7,844,890 B2 | 11/2010 | Schmidt |
| 7,844,961 B2 | 11/2010 | Klein |
| 7,856,457 B1 | 12/2010 | Klein et al. |
| 7,877,695 B2 | 1/2011 | Brunswig et al. |
| 7,882,085 B2 | 2/2011 | Klein et al. |
| 7,926,026 B2 | 4/2011 | Klein et al. |
| 7,975,013 B2 | 7/2011 | Schmidt |
| 7,991,787 B2 | 8/2011 | Klein |
| 8,027,963 B2 | 9/2011 | Dentzer et al. |
| 8,051,092 B2 | 11/2011 | Klein et al. |
| 8,090,754 B2 | 1/2012 | Schmidt et al. |
| 8,090,995 B2 | 1/2012 | Klein |
| 8,103,916 B2 | 1/2012 | Klein |
| 8,156,124 B2 | 4/2012 | Klein et al. |
| 8,212,683 B2 | 7/2012 | Klein et al. |
| 8,219,974 B2 | 7/2012 | Schmidt |
| 8,285,985 B2 | 10/2012 | Klein |
| 8,290,976 B2 | 10/2012 | Klein et al. |
| 8,484,206 B2 | 7/2013 | Schmidt et al. |
| 8,504,990 B2 | 8/2013 | Klein et al. |
| 8,533,413 B2 | 9/2013 | Brunswig et al. |
| 8,612,927 B2 | 12/2013 | Brunswig et al. |
| 8,621,492 B2 | 12/2013 | Klein et al. |
| 8,635,684 B2 | 1/2014 | Thun |
| 8,639,991 B2 | 1/2014 | Klein et al. |
| 8,645,483 B2 | 2/2014 | Odenheimer et al. |
| 8,661,297 B2 | 2/2014 | Klein |
| 8,719,833 B2 | 5/2014 | Schmidt |
| 8,806,422 B2 | 8/2014 | Brunswig et al. |
| 8,856,754 B2 | 10/2014 | Klein |
| 8,868,830 B2 | 10/2014 | Duevel et al. |
| 8,904,352 B2 | 12/2014 | Klein et al. |
| 9,164,752 B2 | 10/2015 | Kaiser et al. |
| 9,171,039 B2 | 10/2015 | Teichmann et al. |
| 9,182,979 B2 | 11/2015 | Odenheimer et al. |
| 9,201,912 B2 | 12/2015 | Odenheimer et al. |
| 9,229,993 B2 | 1/2016 | Odenheimer et al. |
| 9,317,526 B1 | 4/2016 | Klein |
| 9,317,711 B2 | 4/2016 | Klein et al. |
| 9,335,832 B2 | 5/2016 | Klein |
| 9,350,625 B2 | 5/2016 | Odenheimer |
| 9,367,870 B2 | 6/2016 | Klein et al. |
| 9,449,343 B2 | 9/2016 | Mayerle et al. |
| 9,602,540 B1 * | 3/2017 | Johansson ............... H04L 63/20 |
| 10,523,493 B2 * | 12/2019 | Hill ........................ H04L 47/70 |
| 2002/0005850 A1 | 1/2002 | Osborne |
| 2008/0154994 A1 | 6/2008 | Fischer et al. |
| 2008/0243781 A1 | 10/2008 | Kuhr et al. |
| 2008/0263007 A1 | 10/2008 | Schmidt |
| 2009/0150168 A1 | 6/2009 | Schmidt |
| 2009/0150906 A1 | 6/2009 | Schmidt et al. |
| 2010/0287553 A1 | 11/2010 | Schmidt et al. |
| 2011/0265147 A1 * | 10/2011 | Liu ........................ H04L 63/08 726/4 |
| 2011/0307947 A1 * | 12/2011 | Kariv ..................... H04L 63/08 726/9 |
| 2012/0087564 A1 | 4/2012 | Tsujita |
| 2012/0246130 A1 | 9/2012 | Schmidt |
| 2013/0024919 A1 * | 1/2013 | Wetter ................. G06F 21/335 726/6 |
| 2013/0325672 A1 | 12/2013 | Odenheimer et al. |
| 2014/0012767 A1 | 1/2014 | Schmidt |
| 2014/0123263 A1 | 5/2014 | Thun |
| 2014/0205168 A1 | 7/2014 | Kim |
| 2014/0325069 A1 | 10/2014 | Odenheimer et al. |
| 2014/0325600 A1 | 10/2014 | Odenheimer |
| 2017/0142094 A1 * | 5/2017 | Doitch ............... H04L 63/0807 |
| 2018/0068059 A1 | 3/2018 | Odenheimer et al. |
| 2018/0137520 A1 | 5/2018 | Schmidt |
| 2018/0248884 A1 * | 8/2018 | Karunakaran ...... H04L 63/0815 |

* cited by examiner

MEDIATED AUTHENTICATION AND AUTHORIZATION FOR SERVICE CONSUMPTION AND BILLING

BACKGROUND

Microservice application development can include utilizing external services provided by various cloud service providers. Each microservice can represent a business activity that has a specified outcome. A developer can select various microservices that each provide functionality used by the application under development. To access and use a service, the developer can provide credentials to the provider of the service. The service provider may offer use of the service for a fee, and billing can be initiated based on the consumption of the service that has occurred.

SUMMARY

The present disclosure describes the providing of mediated authentication and authorization for service consumption and billing.

In an implementation, a request is received for execution of a cloud service for a user of a customer of a cloud-computing platform, the request including a user identifier of the user but not a password for the user. The customer is determined from the user identifier included in the request for execution of the cloud service. A cloud connector endpoint for the customer is determined, where the cloud connector endpoint identifies a secure cloud connector tunnel for communication with a user mapper installed in a customer landscape of the customer. An authorization and authentication request is sent to the user mapper using the secure cloud connector tunnel, where the user mapper is configured to authenticate the user within the customer landscape and determine whether the user is authorized to use the requested cloud service. An authorization and authentication response is received from the user mapper that indicates whether the user is an authenticated user who is authorized to use the cloud service. In response to the authorization and authentication response indicating that the user is an authenticated user who is authorized to use the cloud service, a cloud token is granted that enables use of the cloud service.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented so as to realize one or more of the following advantages. First, a developer can avoid having to request corporate reimbursement for use of a cloud service for which the developer used. Second, corporate accounts payable departments can avoid having to handle reimbursement requests for employee use of external cloud services. Third, employee use of external cloud services can be approved and tracked. Fourth, external cloud services companies can enjoy increased usage due to more efficient authorization of users who may wish to use offered services. Fifth, a large enterprise can use a trusted provider to avoid having to establish trust relationships and enterprise accounts with every cloud service the large enterprise desires to use.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
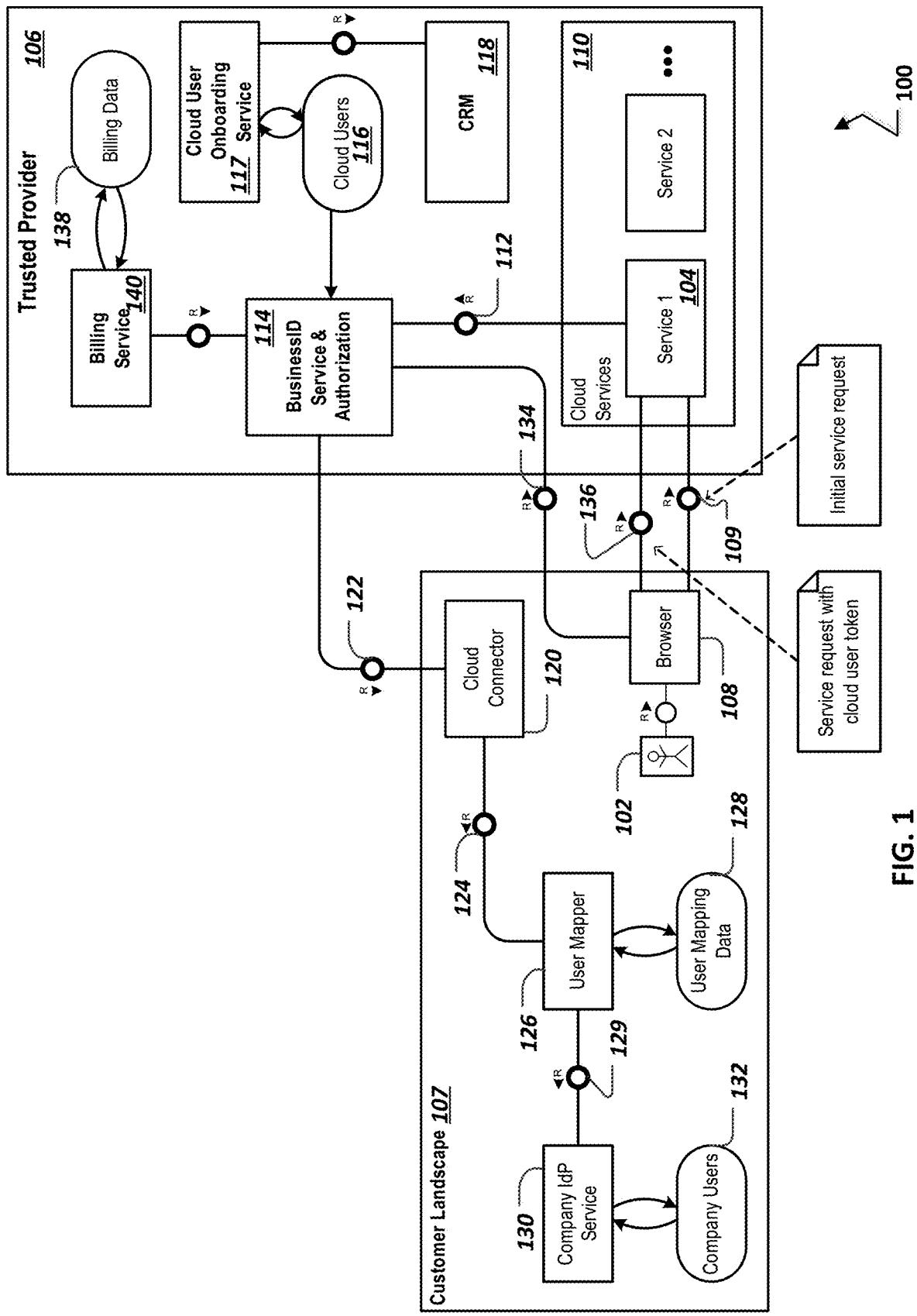
FIG. 1 is a block diagram illustrating an example of a system for providing mediated authentication and authorization for service consumption and billing, according to an implementation of the present disclosure.

The following detailed description describes providing mediated authentication and authorization for service consumption and billing, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Today's cloud-computing economy is evolving rapidly. Many companies, including small start-up companies, offer services for use in cloud-computing environments. Cloud services can offer benefits for application development, including for traditional enterprises. However, a traditional enterprise may have security concerns about interacting with unfamiliar cloud service providers. A large enterprise may adopt the use of new services reluctantly due to a desire for caution in establishing trust relationships with a new start-up company. In particular, a large enterprise may be hesitant to share information about its employees with a multitude of small companies.

In an example, a cloud service provider may generally require a service requester to provide credentials to use a particular service. However, a large enterprise generally will not want to share credentials (such as, employee account information) for every employee (for example, developers) who may wish to use the particular service. Also, a developer at a large enterprise may find it tedious to establish a registered personal account at each cloud service provider the developer wishes to use when developing an application. Additionally, the cloud service provider may bill for use of the service, and a developer generally will not want to personally pay for company use of the service and to deal with hassles of corporate reimbursement.

A large, well-known, and well-respected entity can be established as a centrally trusted business identity provider (that is, as an international trust authority for enterprises). The trusted provider can have existing, established business relationships with large enterprises. Most large enterprises may be known to the trusted provider based on a prior establishment of a registered company account with the trusted provider, or on other interactions. Prior interactions between a large enterprise and the trusted provider can help to establish a trust relationship between the large enterprise and the trusted provider.

The trust relationship can be leveraged by allowing a developer at a large enterprise to use services of the trusted provider (or other providers) while being authenticated by an identity provider within the developer's company. For developer use of third-party cloud services, the trusted provider can act as a contract broker between a large enterprise and smaller third-party cloud service providers. The identity of the large enterprise need not be revealed to the third-party and all billing can be mediated by the trusted provider. Neither the trusted provider nor the third-party provider are made aware of detailed employee information of the large enterprise employee. Use of services can be granted based on trusted relationships between the trusted provider and the large enterprise, and between the third-party provider and the trusted provider.

FIG. 1 is a block diagram illustrating an example of a system 100 for providing mediated authentication and authorization for service consumption and billing, according to an implementation of the present disclosure. A user 102 wants to use a cloud service 104 provided by a trusted provider 106 (for example, a cloud-computing platform). The user 102, who may be an employee (for example, a developer) of a customer company of the trusted provider 106, may not want to create an individual account with the trusted provider 106 or want to go through an ordeal to obtain credentials for an enterprise account that the customer has with the trusted provider 106. The user 102 may just want to use the cloud service 104 in a manner similar to that he/she is used to from end-user cloud offerings.

As described in following paragraphs, the user 102 can use the cloud service 104 provided by the trusted provider 106 without requiring a dedicated named user account for the trusted provider 106. The customer company can have an established business relationship with the trusted provider 106. The customer may have a registered customer account with the trusted provider 106, for example. As described in following paragraphs, the registered customer account can be used for the user 102, in the background, without the user 102 needing to know the details of, or to specify, the registered customer account.

The user 102 can be uniquely identifiable within a customer landscape 107 of the customer, for example by an E-mail address or some other user identifier. The user 102 does not have a direct named account with the trusted provider 106. The user 102 can be logged into the customer landscape 107. The customer landscape 107 can include a local network, interfaces to external networks, a firewall, and other components. The customer landscape 107 can use SSO (Single Sign On) so a browser 108 of the user 102 may have a SSO token associated with the customer.

The user 102 uses the browser 108 running in the customer landscape 107 to send an initial request 109 to the trusted provider 106 to use the cloud service 104. The initial request 109 can include a service endpoint for the cloud service 104 and an email address of the user 102, but does not include other identifying information about the user 102. A cloud services component 110 can send a sign-in request to the browser 108. The user 102 can enter a company email address, but does not enter a corresponding password (since the user 102 does not want to supply company credentials to the external trusted provider 106.

The cloud services component 110 can forward the initial request 109, including the received E-mail address (as illustrated by a forwarded request 112) to a business identification service 114, for authentication of the user 102. The business identification service 114 can determine the customer from the E-mail address (for example, based on a domain included in the E-mail address) and query a cloud user's repository 116 to determine that the customer has a registered customer account with the trusted provider 106. The business identification service 114 can use an onboarding service 117 to query a CRM (Customer Relationship Management) system 118 to determine a cloud connector endpoint for a cloud connector 120 in the customer landscape 107. The business identification service 114 then has the following information: a registered customer account for the customer, the endpoint of the cloud connector 120, the E-mail address of the user 102, and the endpoint of the cloud service 104 requested by the user 102.

The business identification service 114 can send a request 122 using the cloud connector 120 in the customer landscape 107. The cloud connector 120 can be provided by the trusted provider 106 as a secure tunnel for the trusted provider 106 into the customer landscape 107. The customer can allow the cloud connector 120 to be installed based on the established business relationship with the trusted provider 106.

The request 122 can include the email address of the user 102 and information identifying the cloud service 104. The request 122 can be a request to authenticate the user 102 in the customer landscape 107 for using the cloud service 104 as a user of the customer and to determine whether the user 102 is authorized to use the cloud service 104.

The request 122 can result in a call 124 to a user mapper 126 included in the customer landscape 107. The business identification service 114 delegates the authentication and authorization of the user 102 using the cloud service 104 to the user mapper 126 installed inside the customer landscape 107. The user mapper 126 registers customer users who are allowed to use certain cloud services outside the customer landscape 107.

In response to the call 124, the user mapper 126 can perform an authorization check to determine whether the user 102 is allowed to use the cloud service 104. The user mapper 126 can query user mapping data 128 to determine whether the user mapping data 128 includes an entry that indicates that the user 102 is allowed to use the cloud service 104. A given user may be authorized to use various (for example, one, or multiple) external services.

If the user 102 is authorized to use the cloud service 104, the user mapper 126 sends a request 129 to an identity provider (IDP) service 130 to authenticate the user 102. Although authentication is described as occurring after authorization, authentication can occur before authorization. The identity provider service 130 is responsible for user authentication as a service and acts as a trusted identity provider within the customer landscape 107. The identity provider service 130 manages registered company user accounts 132 may support single-sign-on.

The identity provider service 130 can authenticate the user 102 in various ways. A SSO token associated with the user 102 can be included in the initial request 109 (and forwarded along a request chain and included in the requests 112 and 122). The identity provider service 130 can check the validity of the token. As another example, the identity provider service 130 can present an authentication dialog to the user 102 for the user 102 to enter company credentials. The identity provider service 130 can determine whether the entered credentials are valid.

If the user credentials are valid, the user mapper 126 can locate an entry in the user mapping data 128 that maps a user identifier (email address) of the user 102 to a registered customer account. The registered customer account is an account identifier that is known to the trusted provider 106. User identifiers of users who are allowed to use service(s) of the trusted provider 106 can be mapped to the registered customer account, in the user mapping data 128, to indicate that respective users are allowed to use services provided by the trusted provider 106.

The user mapper 126 can return the registered customer account identifier, and a password for the registered customer account, to the business identification service 114, using the cloud connector 120. The user 102 need not be aware of the registered customer account identifier or the password for the registered customer account. The business identification service 114 can check the validity of the registered customer account identifier and the password and grant a cloud token that is valid for use of the cloud service 104 at the trusted provider 106. The trusted provider 106 does not need to know the password for the user 102 within the customer landscape 107. The trusted provider 106 can allow the user 102 to use the cloud service 104 based on receiving the registered customer account identifier and password from the user mapper 126, which indicates that the customer has approved use of the cloud service 104 by the user 102.

The cloud token is passed by the business identification service 114 to the browser 108 (as illustrated by a message 134). In response to receiving the cloud token, the browser 108 sends a second request 136 for the cloud service 104 that includes the cloud token. The cloud services component 110 can allow use of the cloud service 104 based on the second request 136 including the cloud token. Use of the service 104 can be logged, in association with the cloud token, as billing data 138. The billing data 138 can be tracked to the customer, based on the cloud token being associated with the registered customer account. A billing service 140 can bill the customer, based on the logged usage.

Figure 2:
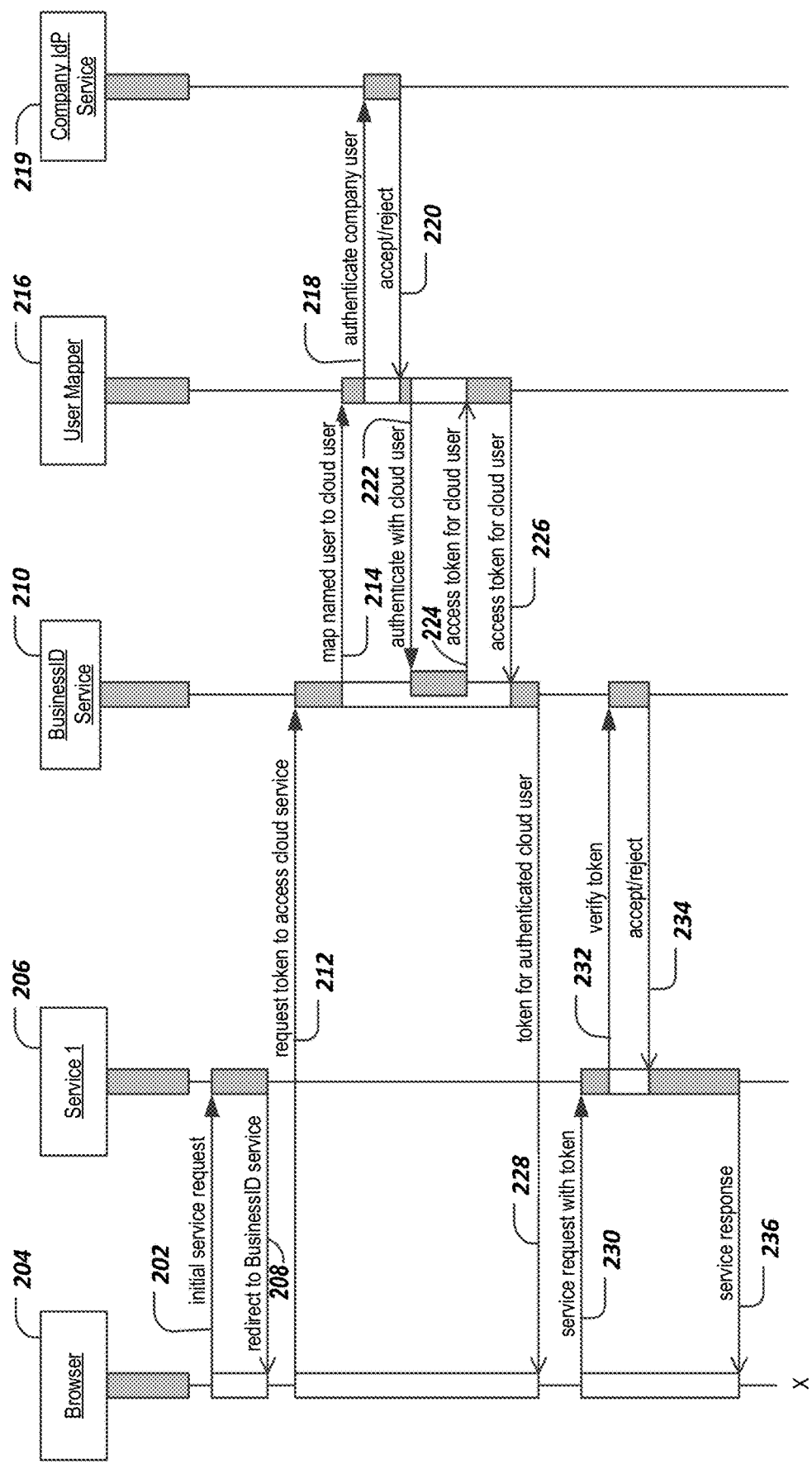
FIG. 2 is a swim lane diagram illustrating an example of a method for providing mediated authentication and authorization for service consumption and billing, according to an implementation of the present disclosure.

FIG. 2 is a swim lane diagram illustrating an example of a method 200 for providing mediated authentication and authorization for service consumption and billing, according to an implementation of the present disclosure. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, a browser 204 sends an initial request to a trusted provider 206 of a first cloud service to access the first cloud service. The initial request can include an E-mail address of a user of the browser 204. The user can be a developer at a company who wants to use the first cloud service while developing an application, for example. At 208, the trusted provider 206 sends a response to the initial request instructing the browser 204 to redirect to a business identification service 210 included in the trusted provider.

At 212, the browser 204 sends a request to the business identification service 210 for a token to access the first cloud service. In some implementations, the initial request is forwarded internally within the trusted provider 206 to the business identification service 210, rather than the business identification service 210 receiving the request for the token from the browser 204.

At 214, the business identification service 210 sends a request to a user mapper 216 in the customer landscape of the user to map the received E-mail address to a cloud user. The cloud user may be a customer account that the customer has registered with the trusted provider 206. At 218, the user mapper 216 can send a request to a company identity provider (IDP) 219 running in the customer landscape to authenticate the user. At 220, the company identity provider 219 sends a response to the user mapper 216 regarding whether the user has been authenticated. At 222, the user mapper sends a message to the business identification service 210 informing the business identification service 210 whether the user represented by the E-mail address is a valid user. At 224, if the message indicates that the user is a valid user, the business identification service 210 sends a request to the user mapper 216 for an access token for the user. The user mapper can retrieve an access token that is mapped to the user. At 226, the access token is sent to the business identification service 210 in response to the request for the access token. At 228, the business identification service 210 sends the access token to the browser 204, to be used as an access token for a now-authenticated user.

At 230, the browser 204 sends a second request for the first cloud service, to the trusted provider 206. The second request includes the access token received by the browser 204 at 228. At 232, the trusted provider 206 sends an internal request to the business identification service 210 to verify the access token included in the second request. At 234, the business identification service 210 provides an indication as to whether the access token is valid. At 236, if the access token is valid, the trusted provider 206 processes the second request for the first cloud service and sends a response to the browser 204.

Figure 3:
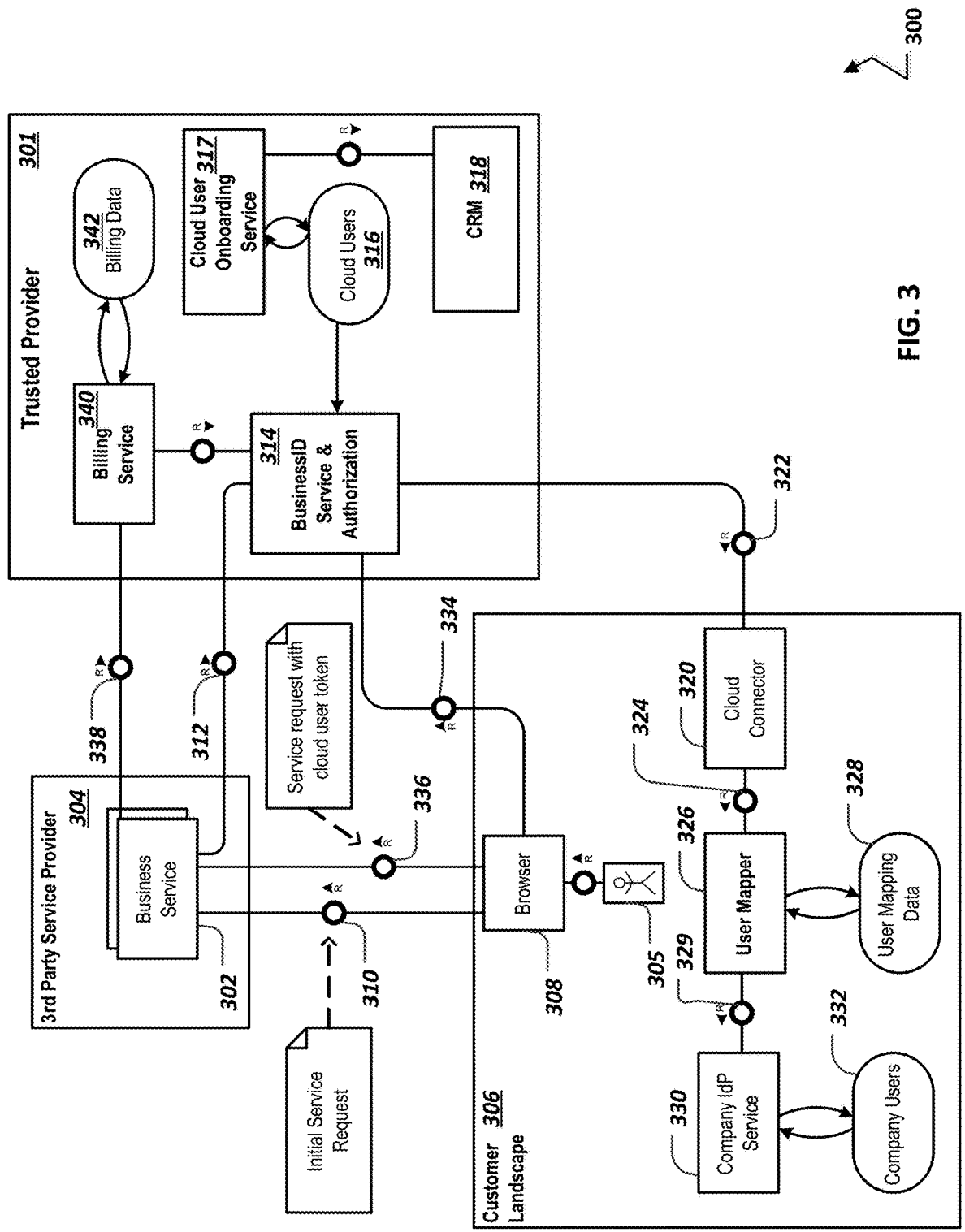
FIG. 3 is a block diagram illustrating an example of a system for providing mediated authentication and authorization for third-party service consumption and billing, according to an implementation of the present disclosure.

FIG. 3 is a block diagram illustrating an example of a system 300 for providing mediated authentication and authorization for third-party service consumption and billing, according to an implementation of the present disclosure. The previously-described system 100 of FIG. 1 includes a service consumption scenario where the trusted provider 106 provides a service as well as being a trust relationship provider. As another example, the system 300 is for a scenario where a trusted provider 301 mediates use of a third-party cloud service 302 provided by a third-party service provider 304.

A user 305 of a customer of the trusted provider 304 wants to use the third-party cloud service 302. The user 305 can be uniquely identifiable within a customer landscape 306 of the customer, for example by an E-mail address or some other user identifier. The user 305 does not have a direct named account with the trusted provider 301 or the third-party service provider 304. The user 305 can be logged into the customer landscape 306. The customer landscape 306 can use SSO so a browser 308 of the user 305 may have a SSO token associated with the customer.

The user 305 uses the browser 308 running in the customer landscape 306 to send an initial request 310 to the third-party service provider 304 to use the third-party cloud service 302. The initial request 310 can include a service endpoint for the third-party cloud service 302 and an email address of the user 305, but does not include other identifying information about the user 305. The third-party service provider 304 can partner with the trusted provider 301 to enable the user 305 to be authorized and authenticated for use of the third-party cloud service 302.

In response to receiving the initial request 310, the third-party service provider 304 can send a sign-in request to the browser 308. The user 305 can enter a company email address, but does not enter a corresponding password (since the user 305 does not want to supply company credentials to the third-party service provider 304). The third-party service provider 304 can forward the initial request 310, including the received E-mail address (as illustrated by a forwarded request 312) to a business identification service 314 included in the trusted provider 301, for authentication of the user 305. In some implementations, the trusted provider 301 sends the sign-in request to the browser 308, rather than the third-party service provider 304, in response to the trusted provider 301 receiving a request from the trusted provider 304.

In response to receiving the forwarded request 312, the business identification service 314 can determine the customer from the E-mail address (for example, based on a domain included in the E-mail address) and query a cloud user's repository 316 to determine that the customer has a registered customer account with the trusted provider 301. The business identification service 314 can use an onboarding service 317 to query a CRM system 318 to determine a cloud connector endpoint for a cloud connector 320 in the customer landscape 306.

The business identification service 314 can send a request 322 using the cloud connector 320. The cloud connector 320 can be provided by the trusted provider 301 as a secure tunnel for the trusted provider 301 into the customer landscape 306. The customer can allow the cloud connector 320 to be installed based on the established business relationship with the trusted provider 301.

The request 322 can include the email address of the user 305 and information identifying the third-party cloud service 302. The request 322 can be a request to authenticate the user 305 in the customer landscape 306 for using the third-party cloud service 305 and to determine whether the user 305 is authorized to use the third-party cloud service 302.

The request 322 can result in a call 324 to a user mapper 326 included in the customer landscape 306. The third-party service provider 304 and the business identification service 314 delegate the authentication and authorization of the user 305 using the third-party cloud service 302 to the user mapper 326 installed inside the customer landscape 306. The user mapper 326 registers customer users who are allowed to use certain cloud services outside the customer landscape 306, in user mapping data 328.

In response to the call 324, the user mapper 326 can perform an authorization check to determine whether the user 305 is allowed to use the third-party cloud service 302. The user mapper 326 can query the user mapping data 328 to determine whether the user mapping data 328 includes an entry that indicates that the user 305 is allowed to use the third-party cloud service 302.

If the user 305 is authorized to use the third-party cloud service 302, the user mapper 326 sends a request 329 to an identity provider service 330 to authenticate the user 305. The identity provider service 330 can present an authentication dialog to the user 305 for the user 305 to enter company credentials. The identity provider service 330 can determine whether the entered credentials are valid, such as determining whether the entered credentials match information in a company user database 332.

If the user credentials are valid, the user mapper 326 can locate an entry in the user mapping data 328 that maps a user identifier (email address) of the user 305 to a registered customer account that is known by the trusted provider 301. User identifiers of users who are allowed to use service(s) mediated by the trusted provider 301 can be mapped to the registered customer account, in the user mapping data 328. The user mapper 326 can return the registered customer account identifier, and a password for the registered customer account, to the business identification service 314, using the cloud connector 320. The user 305 need not be aware of the registered customer account identifier or the password for the registered customer account. The business identification service 314 can check the validity of the registered customer account identifier and the password and grant a cloud token that is valid for use of services mediated by the trusted provider 301, including the third-party cloud service 302. The trusted provider 301 does not need to know the password for the user 305 within the customer landscape 306.

The cloud token is passed by the business identification service 314 to the browser 308 (as illustrated by a message 334). In response to receiving the cloud token, the browser 308 sends a second request 336 for the third-party cloud service 302 that includes the cloud token. The third-party service provider 304 can allow use of the third-party cloud service 302 based on the second request 336 including the cloud token.

Use of the third-party cloud service 302 can be logged, in association with the cloud token. The third-party service provider 304 can send a billing request 338 to a billing service 340 of the trusted provider 301. The billing request 338 can include the cloud token, a business partner identifier for the third-party service provider 304, and usage information for the third-party cloud service 302. The trusted provider 301 can store information from the request 338 in billing data 342. The trusted provider 301 can bill the customer company of the user 305 and credit the third-party service provider 304 for the use by the user 305 of the third-party service provider 302.

The trusted provider 301 can charge the third-party service provider 304 or the customer company of the user 305 for mediation services associated with the use of the third-party service 302. The trusted provider 301 can monetarily leverage the established relationships with the customer company of the user 305 and the third-party service provider 304. The trusted relationships established by the trusted provider 301 can enable users of a customer of the trusted provider 301 to use a service of any third-party that has a business relationship with the trusted provider without having a dedicated user-specific identifier for either the trusted provider 301 or the third-party. The customer and the third-party can place a value on the mediation services provided by the trusted provider and be willing to pay the trusted provider 301 for such mediation services.

Figure 4:
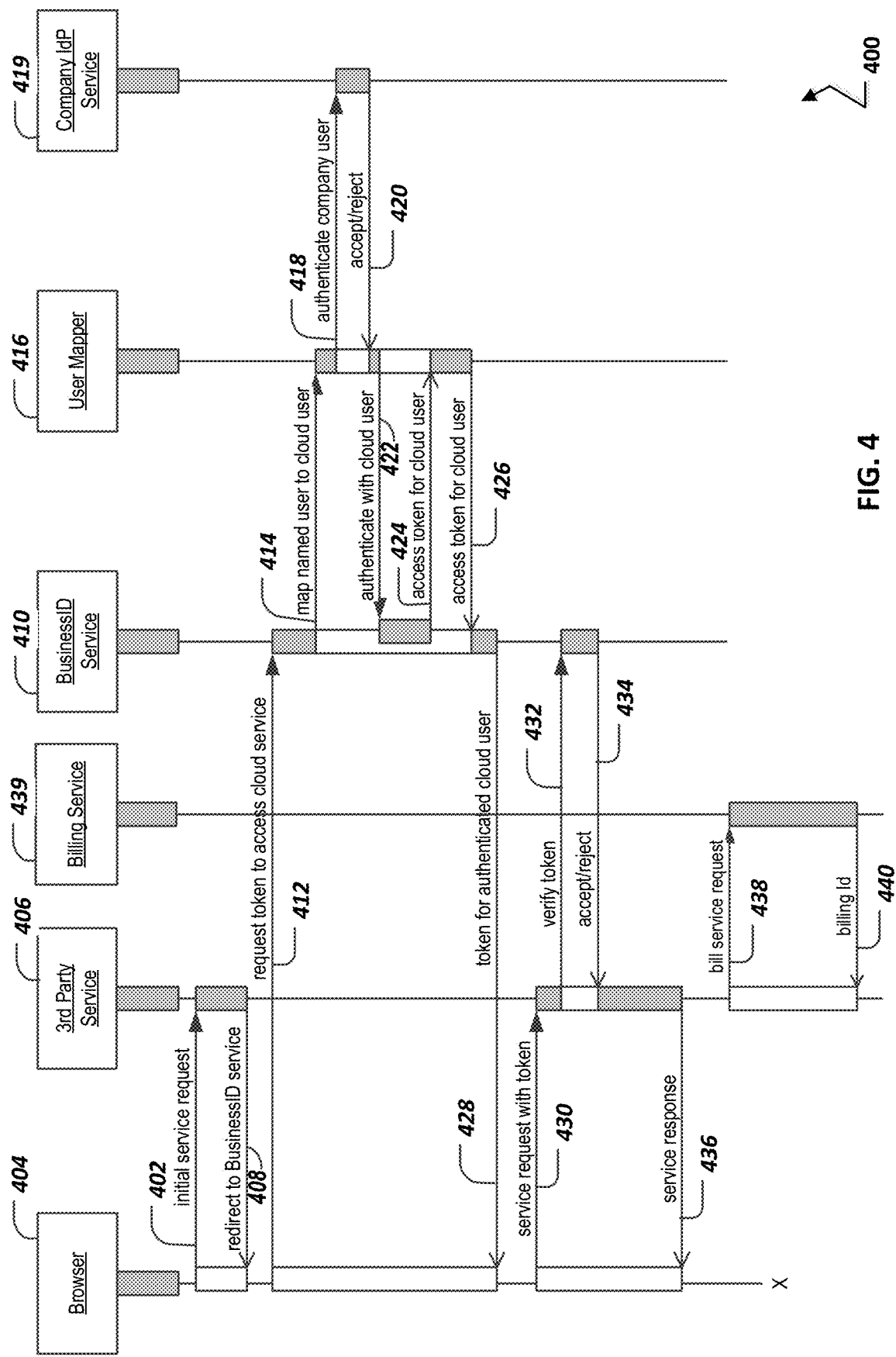
FIG. 4 is a swim lane diagram illustrating an example of a method for providing mediated authentication and authorization for third-party service consumption and billing, according to an implementation of the present disclosure.

FIG. 4 is a swim lane diagram illustrating an example of a method 400 for providing mediated authentication and authorization for third-party service consumption and billing, according to an implementation of the present disclosure. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402, a browser 404 sends an initial request to a third-party service provider 406 of a third-party cloud service to access the third-party cloud service. The initial request can include an E-mail address of a user of the browser 404. At 408, the third-party service provider 406 sends a response to the initial request instructing the browser 404 to redirect to a business identification service 410 included in a trusted provider. At 412, the browser 404 sends a request to the business identification service 410 for a token to access the third-party cloud service.

At 414, the business identification service 410 sends a request to a user mapper 416 in the customer landscape of the user to map the received E-mail address to a cloud user that is a company account for the customer at the trusted provider. At 418, the user mapper 416 can send a request to a company identity provider (IDP) 419 running in the customer landscape to authenticate the user in the customer landscape. At 420, the company identity provider 419 sends a response to the user mapper 416 regarding whether the user has been authenticated.

At 422, the user mapper 416 sends a message to the business identification service 410 informing the business identification service 410 whether the user is a valid user. At 424, if the message indicates that the user is a valid user, the business identification service 410 sends a request to the user mapper 416 for an access token for the company account for the cloud user. The user mapper 416 can retrieve an access token. At 426, the access token is sent to the business identification service 410 in response to the request for the access token. At 428, the business identification service sends the access token to the browser 404, to be used as an access token for use of the third-party cloud service.

At 430, the browser 404 sends a second request for the third-party cloud service, to the third-party service provider 406. The second request includes the access token received by the browser 404 at 428. At 432, the third-party service provider 406 sends a request to the business identification service 410 to verify the access token included in the second request. At 434, the business identification service 410 provides an indication as to whether the access token is valid. At 436, if the access token is valid, the third-party service provider 406 processes the second request for the third-party cloud service and sends a response to the browser 404.

At 438, the third-party service provider 406 sends a bill service request to a billing service 439 associated with the trusted provider. At 440, the billing service 439 provides billing information to the third-party service provider 406. The billing information can indicate that the trusted provider has credited the third-party service provider 406 for use of the third-party cloud service. The trusted provider can bill the customer company of the user for use of the third-party cloud service.

Figure 5:
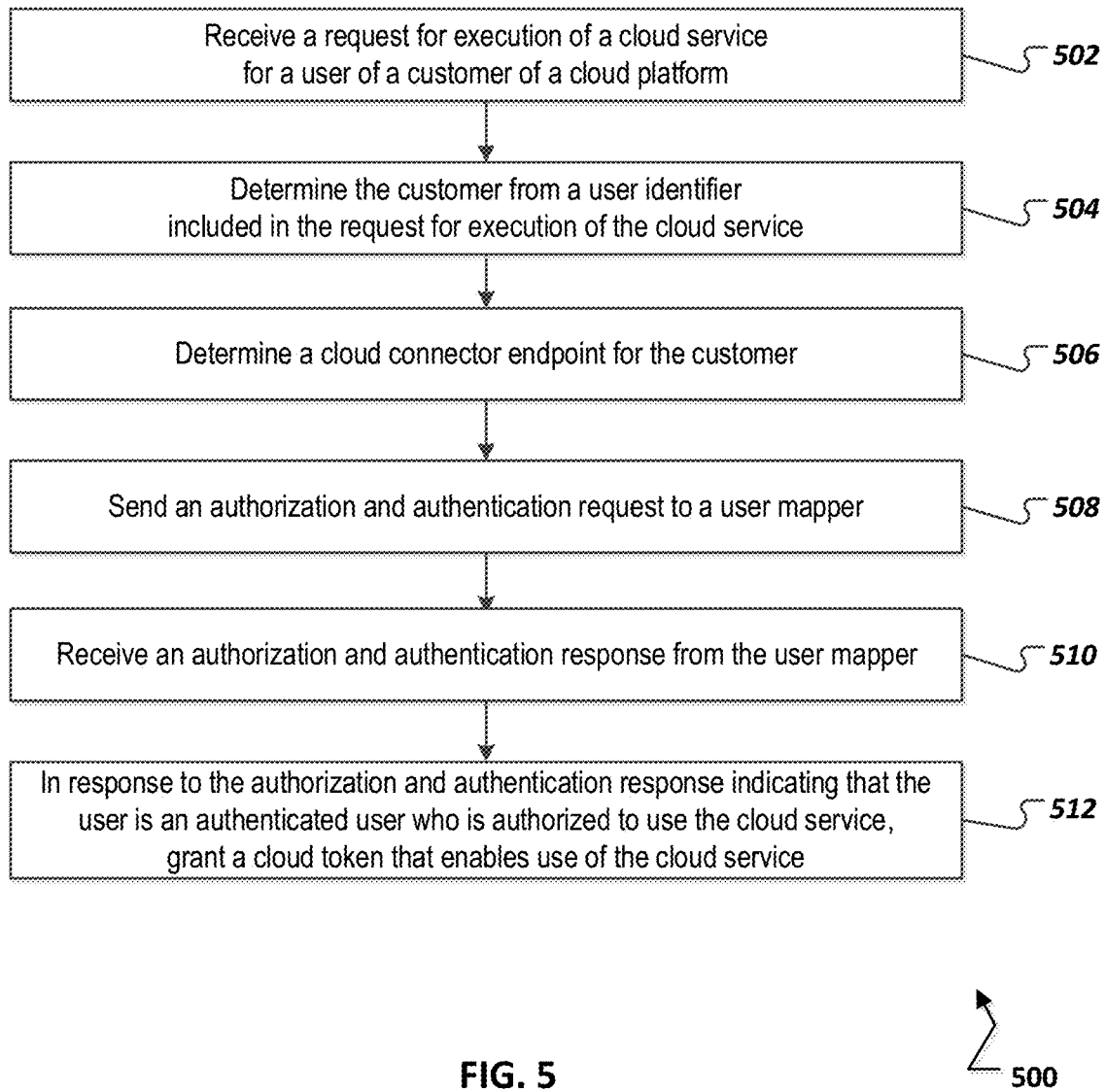
FIG. 5 is a flowchart illustrating an example of a computer-implemented method for providing mediated authentication and authorization for service consumption and billing, according to an implementation of the present disclosure.

FIG. 5 is a flowchart illustrating an example of a computer-implemented method 500 for providing mediated authentication and authorization for service consumption and billing, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a request for execution of a cloud service for a user of a customer of a cloud-computing platform is received. The request includes a user identifier of the user but not a password for the user. From 502, method 500 proceeds to 504. The user is not registered with the cloud-computing platform. The cloud service can be provided by the cloud-computing platform or by a third-party that has an established relationship with the cloud-computing platform. The request can be received from a browser of the user or the third-party.

At 504, the customer is determined from the user identifier included in the request for execution of the cloud service. From 504, method 500 proceeds to 506.

At 506, a cloud connector endpoint for the customer is determined. The cloud connector endpoint identifies a secure cloud connector tunnel for communication with a user mapper installed in a customer landscape of the customer. From 506, method 500 proceeds to 508.

At 508, an authorization and authentication request is sent, using the secure cloud connector tunnel, to the user mapper. The user mapper is configured to authenticate the user within the customer landscape and determine whether the user is authorized to use the requested cloud service. The user mapper can send an authentication request to an identity provider running in the customer landscape to authenticate the user in the customer landscape. From 508, method 500 proceeds to 510.

At 510, an authorization and authentication response is received from the user mapper that indicates whether the user is an authenticated user who is authorized to use the cloud service. From 510, method 500 proceeds to 512.

At 512, in response to the authorization and authentication response indicating that the user is an authenticated user who is authorized to use the cloud service, a cloud token that enables use of the cloud service is granted. After 512, method 500 stops.

Figure 6:
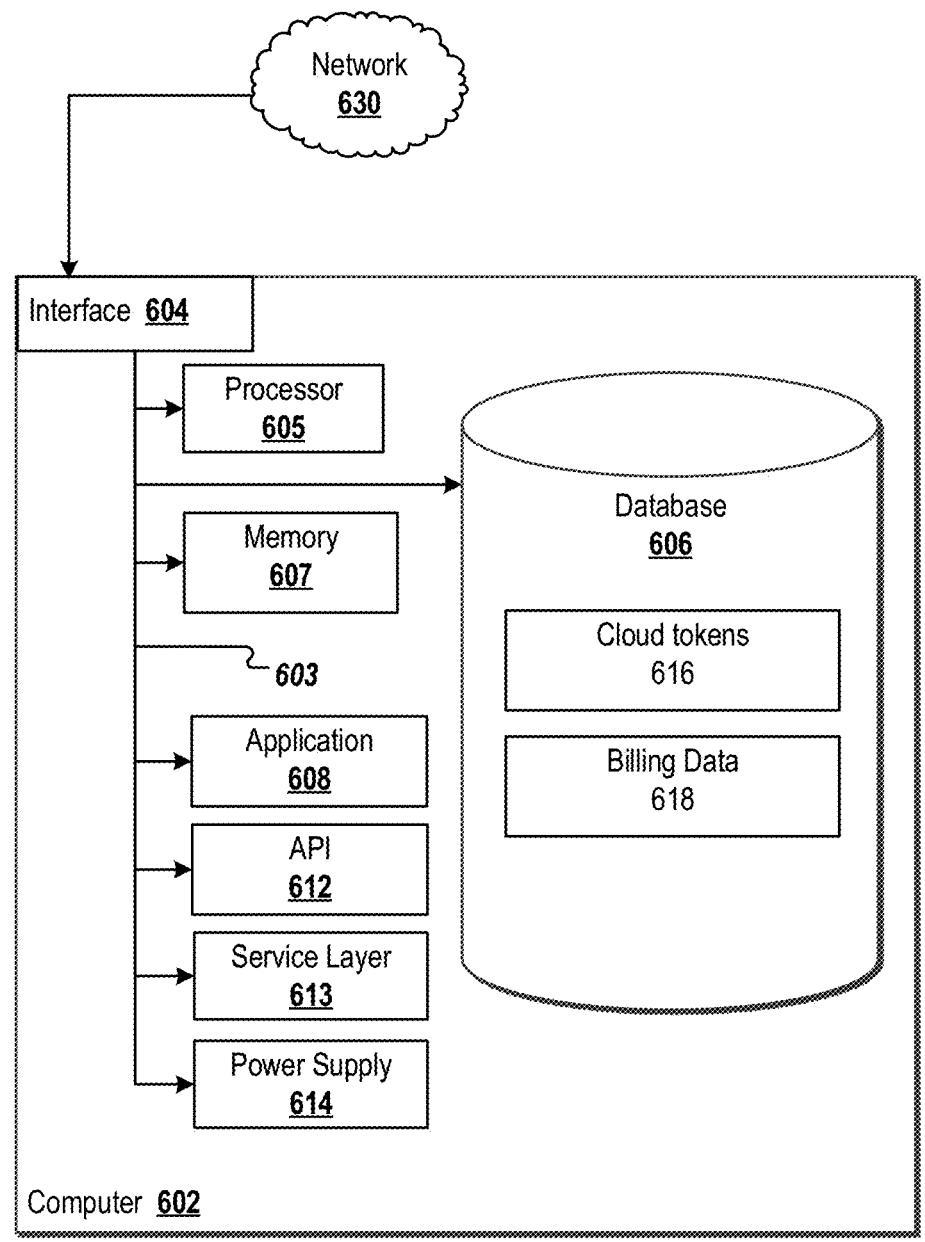
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, System 600 includes a Computer 602 and a Network 630.

The illustrated Computer 602 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device. Additionally, the Computer 602 can include an input device, such as a keypad, keyboard, touch screen, another input device, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as a client, network component, a server, a database or another persistency, another role, or a combination of roles for performing the subject matter described in the present disclosure. The illustrated Computer 602 is communicably coupled with a Network 630. In some implementations, one or more components of the Computer 602 can be configured to operate within an environment, including cloud-computing-based, local, global, another environment, or a combination of environments.

At a high level, the Computer 602 is an electronic computing device operable to receive, transmit, process, store, or manage data and information associated with the described subject matter. According to some implementations, the Computer 602 can also include or be communicably coupled with a server, including an application server, e-mail server, web server, caching server, streaming data server, another server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory, conventional, or another type of database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. As illustrated, the Database 606 holds the previously described cloud tokens 616 and billing data 618.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method, comprising: receiving a request for execution of a cloud service for a user of a customer of a cloud-computing platform, the request including a user identifier of the user but not a password for the user; determining the customer from the user identifier included in the request for execution of the cloud service; determining a cloud connector endpoint for the customer, the cloud connector endpoint identifying a secure cloud connector tunnel for communication with a user mapper installed in a customer landscape of the customer; sending an authorization and authentication request, using the secure cloud connector tunnel, to the user mapper, wherein the user mapper is configured to authenticate the user within the customer landscape and determine whether the user is authorized to use the requested cloud service; receiving an authorization and authentication response from the user mapper that indicates whether the user is an authenticated user who is authorized to use the cloud service; in response to the authorization and authentication response indicating that the user is an authenticated user who is authorized to use the cloud service, granting a cloud token that enables use of the cloud service.

The foregoing and other described implementations can each, optionally, include one or more of the following features:

A first feature, combinable with any of the following features, wherein the user is not registered with the cloud-computing platform.

A second feature, combinable with any of the previous or following features, wherein the cloud service is provided by the cloud-computing platform.

A third feature, combinable with any of the previous or following features, wherein the request for execution of the cloud service is from a browser of the user.

A fourth feature, combinable with any of the previous or following features, wherein the cloud service is provided by a third-party that has an established relationship with the cloud-computing platform.

A fifth feature, combinable with any of the previous or following features, wherein the request for execution of the cloud service is from the third-party.

A sixth feature, combinable with any of the previous or following features, wherein the user mapper sends an authentication request to an identity provider running in the customer landscape to authenticate the user in the customer landscape.

A seventh feature, combinable with any of the previous or following features, further comprising billing the customer for use of the cloud service by the user.

In a second implementation, a non-transitory, computer-readable medium storing one or more instructions executable by a computer system to perform operations comprising: receiving a request for execution of a cloud service for a user of a customer of a cloud-computing platform, the request including a user identifier of the user but not a password for the user; determining the customer from the user identifier included in the request for execution of the cloud service; determining a cloud connector endpoint for the customer, the cloud connector endpoint identifying a secure cloud connector tunnel for communication with a user mapper installed in a customer landscape of the customer; sending an authorization and authentication request, using the secure cloud connector tunnel, to the user mapper, wherein the user mapper is configured to authenticate the user within the customer landscape and determine whether the user is authorized to use the requested cloud service; receiving an authorization and authentication response from the user mapper that indicates whether the user is an authenticated user who is authorized to use the cloud service; in response to the authorization and authentication response indicating that the user is an authenticated user who is authorized to use the cloud service, granting a cloud token that enables use of the cloud service.

The foregoing and other described implementations can each, optionally, include one or more of the following features:

A first feature, combinable with any of the following features, wherein the user is not registered with the cloud-computing platform.

A second feature, combinable with any of the previous or following features, wherein the cloud service is provided by the cloud-computing platform.

A third feature, combinable with any of the previous or following features, wherein the request for execution of the cloud service is from a browser of the user.

A fourth feature, combinable with any of the previous or following features, wherein the cloud service is provided by a third-party that has an established relationship with the cloud-computing platform.

A fifth feature, combinable with any of the previous or following features, wherein the request for execution of the cloud service is from the third-party.

A sixth feature, combinable with any of the previous or following features, wherein the user mapper sends an authentication request to an identity provider running in the customer landscape to authenticate the user in the customer landscape.

A seventh feature, combinable with any of the previous or following features, further comprising billing the customer for use of the cloud service by the user.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: receiving a request for execution of a cloud service for a user of a customer of a cloud-computing platform, the request including a user identifier of the user but not a password for the user; determining the customer from the user identifier included in the request for execution of the cloud service; determining a cloud connector endpoint for the customer, the cloud connector endpoint identifying a secure cloud connector tunnel for communication with a user mapper installed in a customer landscape of the customer; sending an authorization and authentication request, using the secure cloud connector tunnel, to the user mapper, wherein the user mapper is configured to authenticate the user within the customer landscape and determine whether the user is authorized to use the requested cloud service; receiving an authorization and authentication response from the user mapper that indicates whether the user is an authenticated user who is authorized to use the cloud service; in response to the authorization and authentication response indicating that the user is an authenticated user who is authorized to use the cloud service, granting a cloud token that enables use of the cloud service.

The foregoing and other described implementations can each, optionally, include one or more of the following features:

A first feature, combinable with any of the following features, wherein the user is not registered with the cloud-computing platform.

A second feature, combinable with any of the previous or following features, wherein the cloud service is provided by the cloud-computing platform.

A third feature, combinable with any of the previous or following features, wherein the request for execution of the cloud service is from a browser of the user.

A fourth feature, combinable with any of the previous or following features, wherein the cloud service is provided by a third-party that has an established relationship with the cloud-computing platform.

A fifth feature, combinable with any of the previous or following features, wherein the request for execution of the cloud service is from the third-party.

A sixth feature, combinable with any of the previous or following features, wherein the user mapper sends an authentication request to an identity provider running in the customer landscape to authenticate the user in the customer landscape.

A seventh feature, combinable with any of the previous or following features, further comprising billing the customer for use of the cloud service by the user.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware. Data processing hardware encompass all kinds of apparatuses, devices, and machines for processing data, including by way of example, a programmable processor, a computer, or multiple processors or computers. The computer can also be, or further include special purpose logic circuitry, for example, a central processing unit (CPU), a field programmable gate array (FPGA), or an application-specific integrated circuit (ASIC). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving a request for execution of a cloud service for a user of a customer of a cloud-computing platform, the request including a user identifier of the user but not a password for the user;
   determining the customer from the user identifier included in the request for execution of the cloud service;
   determining a cloud connector endpoint for the customer, the cloud connector endpoint identifying a secure cloud connector tunnel for communication with a user mapper installed in a customer landscape of the customer;
   sending an authorization and authentication request, using the secure cloud connector tunnel, to the user mapper, wherein the user mapper is configured to authenticate the user within the customer landscape and determine whether the user is authorized to use the requested cloud service;
   receiving an authorization and authentication response from the user mapper that indicates whether the user is an authenticated user who is authorized to use the cloud service;
   in response to the authorization and authentication response indicating that the user is an authenticated user who is authorized to use the cloud service, granting a cloud token that enables use of the cloud service.

2. The computer-implemented method of claim 1, wherein the user is not registered with the cloud-computing platform.

3. The computer-implemented method of claim 1, wherein the cloud service is provided by the cloud-computing platform.

4. The computer-implemented method of claim 1, wherein the request for execution of the cloud service is from a browser of the user.

5. The computer-implemented method of claim 1, wherein the cloud service is provided by a third-party that has an established relationship with the cloud-computing platform.

6. The computer-implemented method of claim 5, wherein the request for execution of the cloud service is from the third-party.

7. The computer-implemented method of claim 1, wherein the user mapper sends an authentication request to an identity provider running in the customer landscape to authenticate the user in the customer landscape.

8. The computer-implemented method of claim 1, further comprising billing the customer for use of the cloud service by the user.

9. A non-transitory, computer-readable medium storing one or more instructions executable by a computer system to perform operations comprising:
   receiving a request for execution of a cloud service for a user of a customer of a cloud-computing platform, the request including a user identifier of the user but not a password for the user;
   determining the customer from the user identifier included in the request for execution of the cloud service;
   determining a cloud connector endpoint for the customer, the cloud connector endpoint identifying a secure cloud connector tunnel for communication with a user mapper installed in a customer landscape of the customer;

sending an authorization and authentication request, using the secure cloud connector tunnel, to the user mapper, wherein the user mapper is configured to authenticate the user within the customer landscape and determine whether the user is authorized to use the requested cloud service;

receiving an authorization and authentication response from the user mapper that indicates whether the user is an authenticated user who is authorized to use the cloud service;

in response to the authorization and authentication response indicating that the user is an authenticated user who is authorized to use the cloud service, granting a cloud token that enables use of the cloud service.

10. The non-transitory, computer-readable medium of claim 9, wherein the user is not registered with the cloud-computing platform.

11. The non-transitory, computer-readable medium of claim 9, wherein the cloud service is provided by the cloud-computing platform.

12. The non-transitory, computer-readable medium of claim 9, wherein the request for execution of the cloud service is from a browser of the user.

13. The non-transitory, computer-readable medium of claim 9, wherein the cloud service is provided by a third-party that has an established relationship with the cloud-computing platform.

14. The non-transitory, computer-readable medium of claim 13, wherein the request for execution of the cloud service is from the third-party.

15. The non-transitory, computer-readable medium of claim 9, wherein the user mapper sends an authentication request to an identity provider running in the customer landscape to authenticate the user in the customer landscape.

16. The non-transitory, computer-readable medium of claim 9, further comprising billing the customer for use of the cloud service by the user.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a request for execution of a cloud service for a user of a customer of a cloud-computing platform, the request including a user identifier of the user but not a password for the user;
determining the customer from the user identifier included in the request for execution of the cloud service;
determining a cloud connector endpoint for the customer, the cloud connector endpoint identifying a secure cloud connector tunnel for communication with a user mapper installed in a customer landscape of the customer;
sending an authorization and authentication request, using the secure cloud connector tunnel, to the user mapper, wherein the user mapper is configured to authenticate the user within the customer landscape and determine whether the user is authorized to use the requested cloud service;
receiving an authorization and authentication response from the user mapper that indicates whether the user is an authenticated user who is authorized to use the cloud service;
in response to the authorization and authentication response indicating that the user is an authenticated user who is authorized to use the cloud service, granting a cloud token that enables use of the cloud service.

18. The computer-implemented system of claim 17, wherein the user is not registered with the cloud-computing platform.

19. The computer-implemented system of claim 17, wherein the cloud service is provided by the cloud-computing platform.

20. The computer-implemented system of claim 17, wherein the cloud service is provided by a third-party that has an established relationship with the cloud-computing platform; and wherein the request for execution of the cloud service is from the third-party.

* * * * *